US007906570B2

(12) United States Patent
Ueda et al.

(10) Patent No.: US 7,906,570 B2
(45) Date of Patent: Mar. 15, 2011

(54) THERMOPLASTIC RESIN COMPOSITION AND PRODUCTION PROCESS THEREOF

(75) Inventors: Ken-ichi Ueda, Nara (JP); Shigeo Otome, Kyoto (JP); Shoji Ito, Suita (JP); Yow-hei Sohgawa, Tondabayashi (JP); Hideo Asano, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 971 days.

(21) Appl. No.: 11/712,403

(22) Filed: Mar. 1, 2007

(65) Prior Publication Data
US 2007/0208119 A1  Sep. 6, 2007

(30) Foreign Application Priority Data

Mar. 1, 2006 (JP) ................................. 2006-055463

(51) Int. Cl.
C08K 5/09 (2006.01)
(52) U.S. Cl. ........ 524/284; 524/394; 524/397; 524/399; 524/400; 524/432; 524/433; 524/560; 525/328.8; 525/330.3; 525/360; 525/363; 525/368
(58) Field of Classification Search .................. 524/284, 524/394, 397, 399, 400, 432, 433, 560; 525/328.8, 525/330.3, 360, 363, 368
See application file for complete search history.

(56) References Cited

U.S. PATENT DOCUMENTS

| 3,375,216 | A | 3/1968 | Smith et al. | |
|---|---|---|---|---|
| 6,423,806 | B1 | 7/2002 | Nakagawa et al. | |
| 6,492,091 | B2 * | 12/2002 | Kodama et al. | 430/270.1 |
| 6,673,885 | B1 | 1/2004 | Shibata et al. | |
| 6,774,192 | B2 * | 8/2004 | Asano et al. | 525/286 |
| 6,794,460 | B2 * | 9/2004 | Asano et al. | 525/328.8 |
| 2002/0106568 | A1 | 8/2002 | Asano et al. | |
| 2003/0004278 | A1 | 1/2003 | Asano et al. | |
| 2003/0134988 | A1 | 7/2003 | Asano et al. | |

FOREIGN PATENT DOCUMENTS

| CN | 1367802 | 9/2002 |
|---|---|---|
| EP | 0 264 508 | 4/1988 |
| EP | 1 698 663 | 9/2006 |
| JP | 61-254608 | 11/1986 |
| JP | 61-261303 | 11/1986 |
| JP | 7-178335 | 7/1995 |
| JP | 9-241323 | 9/1997 |
| JP | 9-263616 | 10/1997 |
| JP | 9-302257 | 11/1997 |
| JP | 2835396 | 12/1998 |
| JP | 11-124467 | 5/1999 |
| JP | 2000-95821 | 4/2000 |
| JP | 2000-230016 | 8/2000 |
| JP | 3081508 | 8/2000 |
| JP | 2001-40228 | 2/2001 |
| JP | 2001-151814 | 6/2001 |
| JP | 2002-60424 | 2/2002 |
| JP | 2002-120326 | 4/2002 |
| JP | 2002-138106 | 5/2002 |
| JP | 2002-230016 | 8/2002 |
| JP | 2002-254544 | 9/2002 |
| JP | 2003-155309 | 5/2003 |
| JP | 3404160 | 5/2003 |
| JP | 2003-238788 | 8/2003 |
| JP | 2003-292805 | 10/2003 |
| JP | 2004-168882 | 6/2004 |
| JP | 2005-162835 | 6/2005 |
| JP | 2005-232357 | 9/2005 |
| WO | 2005/066267 | 7/2005 |

OTHER PUBLICATIONS

German Office Action dated Jul. 13, 2009, issued in corresponding Application No. 10 2007 009 268.9-43, with translation.
International Search Report mailed Dec. 20, 2005, issued in International (PCT) Application No. PCT/JP2005/015901.
Translation of International Preliminary Report on Patentability issued Feb. 28, 2007, in International (PCT) Application No. PCT/JP2005/015901.
Notice of Reasons for Rejection dispatched Jan. 27, 2009, issued in Japanese Application No. 2004-364917, with translation.
International Search Report mailed Sep. 13, 2005, issued in International (PCT) Application No. PCT/JP2005/014230; and Written Opinion.
Notice of Reasons for Rejection dispatched Apr. 7, 2009, issued in Japanese Application No. 2004-364917, with translation.
Office Action mailed May 8, 2009 in copending U.S. Appl. No. 11/661,366.
Office Action issued Aug. 21, 2009, in corresponding Chinese Application No. 200710085053.8 (with English Translation).
Tom P. Hanschen, Films, Orientation, Encyclopedia of Polymer Science and Technology, pp. 559-577, Oct. 2001.
Notice of Reasons for Rejection dated Mar. 24, 2010 in Japanese Application No. 2004-288057 (with English translation).
Office Action mailed Sep. 8, 2010 in copending U.S. Appl. No. 11/661,366.
German Office Action dated Oct. 18, 2010 issued for the corresponding German Patent Application No. 10 2007 009 268.9-43 (with English translation).

* cited by examiner

*Primary Examiner* — Bernard Lipman
(74) *Attorney, Agent, or Firm* — Wenderoth, Lind & Ponack, L.L.P.

(57) ABSTRACT

Disclosed is a thermoplastic resin composition contains including a methacrylic resin having a ring structure in a main chain thereof and a glass transition temperature of 110° C. or higher, and at least one kind of metal compound selected from metal salts, metal complexes, and metal oxides, wherein a content of the metal compound in the composition is from 10 to 10,000 ppm in terms of metal atom based on a mass of the methacrylic resin, and a process for producing such a thermoplastic resin composition, the process including carrying out, when preparing a methacrylic resin having a ring structure in a main chain thereof and a glass transition temperature of 110° C. or higher, cyclization condensation reaction using a catalyst to form the ring structure; and then adding a deactivator of the catalyst.

7 Claims, No Drawings

THERMOPLASTIC RESIN COMPOSITION AND PRODUCTION PROCESS THEREOF

BACKGROUND OF THE INVENTION

1. Field of the Invention

The present invention relates to a thermoplastic resin composition and a production process thereof, and more specifically, to a thermoplastic resin composition comprising a methacrylic resin having a ring structure in the main chain thereof and a glass transition temperature of 110° C. or higher, and a production process thereof.

2. Description of the Related Art

Conventionally, as a resin having transparency, there have been known methacrylic resins. Because methacrylic resins are excellent both in transparency and in surface gloss and weather resistance and have a good balance of mechanical strength, forming processability, and surface hardness, they have widely been used in applications relevant to optics in cars, home electric appliances, and the like. However, the glass transition temperatures of methacrylic resins are about 100° C., and therefore, it has been difficult to use methacrylic resins in the fields requiring heat resistance.

Recently, as a transparent and heat resistant resin having transparency and heat resistance and further having various characteristics such as mechanical strength and forming processability, there have been proposed some lactone ring-containing polymers obtained by subjecting a polymer having hydroxyl groups and ester groups in the molecular chain thereof to lactone cyclization condensation reaction. An example thereof is a polymer in which a copolymer of 2-(hydroxymethyl)acrylic acid alkyl ester and methyl methacrylate or a copolymer of α-hydroxymethyl styrene and methyl methacrylate is subjected to dealcoholization reaction, one kind of transesterification, to give lactone rings by condensation of hydroxyl groups and ester groups present in the same molecule. However, in the conventional methods, an esterification catalyst or a transesterification catalyst such as sulfuric acid or p-toluenesulfonic acid is used in the dealcoholization reaction, and therefore, there has been a problem of coloring of the obtained polymer when the amount of the catalyst is increased in order to raise the dealcoholization reaction rate, and in contrast, if the dealcoholization rate is low, there has been such a problem that the dealcoholization reaction may progress when the obtained polymer is thermally processed, and bubbles or silver streaks may enter into molded articles.

Thus, Japanese Unexamined Patent Publication No. 2001-151814 discloses a technique of reducing the coloring, securing the excellent transparency, and preventing the entering of bubbles or silver streaks into molded articles by using an organophosphorus compound as a catalyst at the time of dealcoholization reaction. Moreover, Japanese Unexamined Patent Publication No. 2000-230016 discloses a technique of making it possible that the dealcoholization reaction rate is extremely high and the remaining volatile matters in the polymer obtained is also few, and therefore, the entering of bubbles or silver streaks into the molded articles is prevented by carrying out dealcoholization reaction in the presence of a solvent and using a devolatilization step together at the time of the above dealcoholization reaction. In addition, Japanese Unexamined Patent Publication No. 2002-138106 discloses a technique of preventing the progress of dealcoholization reaction when thermal processing is carried out, and therefore, the entering of bubbles or silver streaks into molded articles is prevented by converting unreacted hydroxyl groups to groups not acting as dealcoholization reaction points at the time of dealcoholization reaction.

SUMMARY OF THE INVENTION

However, all the above conventional techniques have still been insufficient to prevent the bubbling phenomenon of a polymer, particularly at the time of thermal processing, and it has been difficult to obtain molded articles causing no entering of bubbles or silver streak.

Under these circumstances, an object to be attained by the present invention is to provide a thermoplastic resin composition, which is excellent both in transparency and in heat resistance and has desired characteristics such as mechanical strength and forming processability, and which can also provide molded articles causing no entering of bubbles or silver streaks without causing a bubbling phenomenon, particularly at the time of thermal processing, and a production process for such a composition.

The present inventors have extensively studied, and as a result, have considered that an alcohol generated, at the time of thermal processing, by the transesterification of active hydrogen atoms, such as hydroxyl groups of unreacted ring formable units (i.e., units which have not formed rings yet) in the copolymerization units forming the molecular chain of a resin, or water present in a small amount in the system, with alkyl ester groups is the main cause of causing a bubbling phenomenon, generally because a catalyst and the like used in the transesterification may remain in the methacrylic resin having a ring structure, which has been formed by the transesterification, and have found that a bubbling phenomenon cannot easily be caused at the time of thermal processing when a deactivator for the catalyst used in the transesterification is added, thereby completing the present invention. In the following, the term "transesterification" may be called "cyclization condensation reaction."

Thus, the present invention provides a thermoplastic resin composition comprising a methacrylic resin having a ring structure in a main chain thereof and a glass transition temperature of 110° C. or higher, and at least one kind of metal compound selected from metal salts, metal complexes, and metal oxides, wherein a content of the metal compound in the composition is from 10 to 10,000 ppm in terms of metal atom based on a mass of the methacrylic resin.

In the thermoplastic resin composition of the present invention, the above metal compound may preferably be a salt of a representative metal element. The representative metal element may preferably be calcium, magnesium, or zinc.

The thermoplastic resin composition of the present invention may comprise an organic acid. In this case, the above metal compound may preferably be a metal salt of an organic acid, and more preferably a metal salt of a carboxylic acid or an organophosphorus compound.

In the thermoplastic resin composition of the present invention, a number of bubbles generated when the composition is heated at 260° C. for 20 minutes may preferably be 20 pieces/g or smaller.

In the thermoplastic resin composition of the present invention, the above methacrylic resin may preferably have a lactone ring-containing structure, and more preferably a lactone ring structure shown by the following formula (1):

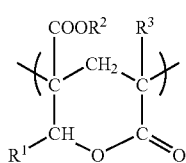

(1)

wherein $R^1$, $R^2$, and $R^3$ each independently represents a hydrogen atom or an organic residue having from 1 to 20 carbon atoms, in which the organic residue optionally contains an oxygen atom(s).

The present invention further provides a process for producing a thermoplastic resin composition as described above, the process comprising carrying out, when preparing a methacrylic resin having a ring structure in a main chain thereof and a glass transition temperature of 110° C. or higher, cyclization condensation reaction using a catalyst, to form the ring structure; and then adding a deactivator of the catalyst.

According to the thermoplastic resin composition and a production process thereof of the present invention, because most of the catalyst used in the cyclization condensation reaction is deactivated with a deactivator, it is possible to provide molded articles which are excellent both in transparency and in heat resistance and have desired characteristics such as mechanical strength and forming processability, and which cause no entering of bubbles or silver streaks without causing a bubbling phenomenon, particularly at the time of thermal processing.

DETAILED DESCRIPTION OF THE INVENTION

Thermoplastic Resin Composition and Production Process Thereof

The thermoplastic resin composition of the present invention is a thermoplastic resin composition comprising a methacrylic resin having a ring structure in a main chain thereof and a glass transition temperature of 110° C. or higher, and at least one kind of metal compound selected from metal salts, metal complexes, and metal oxides, wherein a content of the metal compound in the composition is from 10 to 10,000 ppm in terms of metal atom based on a mass of the methacrylic resin. The phrase "at least one kind of metal compound selected from metal salts, metal complexes, and metal oxides" as used herein means a deactivator added after the cyclization condensation reaction for introducing a ring structure into the main chain of a methacrylic resin, or means a product generated by the reaction of a catalyst used in the cyclization condensation reaction for introducing a ring structure into the main chain of a methacrylic resin and a deactivator added after the cyclization condensation reaction, or a denatured product thereof. This product or a denatured product thereof depends on the kinds of catalyst and deactivator or the conditions of cyclization condensation reaction and devolatilization step, and therefore, is not particularly limited. The content of the metal compound can be expressed in terms of metal atom because a metal is contained either in the catalyst or in the deactivator.

The content of the metal compound in the thermoplastic resin composition of the present invention is generally from 10 to 10,000 ppm in terms of metal atom based on a mass of the methacrylic resin, and the upper limit thereof may preferably be 5,000 ppm, more preferably 3,000 ppm, and still more preferably 1,000 ppm, and the lower limit thereof may preferably be 30 ppm, more preferably 50 ppm, and still more preferably 100 ppm. When the content of the metal compound is lower than 10 ppm, it means that the addition amount of catalyst or deactivator is small, and therefore, the action thereof may become insufficient and a sufficient ring structure may be unable to be introduced into the main chain, so that the heat resistance may be deteriorated, or bubbles or silver streaks may enter into the molded articles. In contrast, when the content of the metal compound is higher than 10,000 ppm, it means that the addition amount of catalyst or deactivator is great, and therefore, the action thereof may be saturated and an unnecessarily great amount of catalyst or deactivator is used, so that problems such as coloring of resin may occur or the production cost may be increased. The content of the metal compound can be measured, for example, by ICP (ICP-AES, ICP-MS), atomic absorption spectrum, ion chromatography, elemental analysis, GC, GC/MS, LC, or the like.

In the thermoplastic resin composition of the present invention, the above metal compound may preferably be a salt of a representative metal element. The typical metallic element may preferably be calcium, magnesium, or zinc.

The thermoplastic resin composition of the present invention may comprise an organic acid. Moreover, the above metal compound may preferably be a metal salt of an organic acid, and more preferably a metal salt of a carboxylic acid or an organophosphorus compound. The term "organic acid" as used herein means a product generated by the decomposition of a catalyst used in the cyclization condensation reaction for introducing a ring structure into the main chain of a methacrylic resin or a deactivator added after the cyclization condensation reaction, or a denatured product thereof. The organic acid and the content thereof depend on the kinds and amounts of catalyst and deactivator to be used, the conditions of cyclization condensation reaction and devolatilization step, and the like, and therefore, are not particularly limited. The content of this organic acid can be measured, for example, by ion chromatography.

To produce the thermoplastic resin composition of the present invention, when preparing a methacrylic resin having a ring structure in a main chain thereof and a glass transition temperature of 110° C. or higher, the ring structure may be formed by cyclization condensation reaction using a catalyst, and then, the catalyst may be deactivated by adding a deactivator. That is, the production process of the thermoplastic resin composition of the present invention comprises carrying out, when preparing a methacrylic resin having a ring structure in a main chain thereof and a glass transition temperature of 110° C. or higher, cyclization condensation reaction using a catalyst to form the ring structure; and then adding a deactivator of the catalyst. As for the production process of the thermoplastic resin composition of the present invention, although the process will be described below in detail when the methacrylic resin is a lactone ring-containing polymer, also in cases where the methacrylic resin is other than the lactone ring-containing polymer, for example, a polymer having a ring structure composed of glutaric anhydride, a 2,5-dioxotetrahydrofuran ring-containing polymer, or a 2,6-dioxotetrahydropyran ring-containing polymer, the production process can similarly be carried out as in case of the lactone ring-containing polymer by appropriately selecting monomer components so as to form one of these ring structures in the main chain by cyclization condensation reaction.

<<Methacrylic Resin>>

In the thermoplastic resin composition of the present invention, as the methacrylic resin having a ring structure in a main chain thereof and having a glass transition temperature of 110° C. or higher, there can be mentioned, for example, lactone ring-containing polymers, polymers having a ring structure composed of glutaric anhydride shown by the following formula (2):

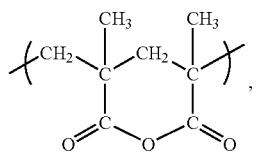

(2)

2,5-dioxotetrahydrofuran ring-containing polymers, and 2,6-dioxotetrahydropyran ring-containing polymers These methacrylic resins may be used alone, or two or more kinds of these methacrylic resins may also be used in combination. In these methacrylic resins, lactone ring-containing polymers may particularly be preferred because the lactone ring-containing polymers are excellent both in transparency and in heat resistance and have desired characteristics such as mechanical strength and forming processability.

The glass transition temperature of the methacrylic resin may usually be 110° C. or higher, preferably 115° C. or higher, more preferably 120° C. or higher, and still more preferably 125° C. or higher, and the upper limit thereof is not particularly limited, but may preferably be 170° C., more preferably 160° C., and still more preferably 150° C. The glass transition temperature of the methacrylic resin is a value obtained by a middle point method according to ASTM-D-3418.

The thermoplastic resin composition and a production process thereof of the present invention will be described below in detail using a lactone ring-containing polymer, which is a particularly preferred methacrylic resin, as an example.

<Structure of Lactone Ring-Containing Polymer>

The lactone ring-containing polymer used in the thermoplastic resin composition of the present invention may preferably have a lactone ring structure shown by the following formula (1) as a ring structure formed by cyclization condensation reaction:

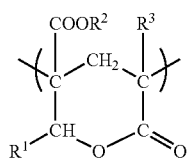

(1)

Wherein $R^1$, $R^2$, and $R^3$ each independently represents a hydrogen atom or an organic residue having from 1 to 20 carbon atoms, in which the organic residue optionally contains an oxygen atom(s). The term "organic residue" as used herein means an alkyl group, a cycloalkyl group, an aryl group, or a substituted aryl group, having from 1 to 20 carbon atoms. Specific examples of the organic residue may include methyl group, ethyl group, propyl group, isopropyl group, butyl group, isobutyl group, t-butyl group, hexyl group, cyclohexyl group, phenyl group, methoxyphenyl group, benzyl group, naphthyl group, octyl group, 2-ethylhexyl group, lauryl group, and stearyl group.

The content of the lactone ring structure represented by the above formula (1) in the structure of the lactone ring-containing polymer may preferably be from 5% to 90% by mass, more preferably from 10% to 70% by mass, still more preferably from 10% to 60% by mass, and particularly preferably from 10% to 50% by mass. When the content of the lactone ring structure is smaller than 5% by mass, the polymer obtained may be deteriorated in heat resistance, solvent resistance, and surface hardness. In contrast, when the content of the lactone ring structure is greater than 90% by mass, the polymer obtained may be deteriorated in forming processability.

The lactone ring-containing polymer may have a structure other than the lactone ring structure represented by the above formula (1). The structure other than the lactone ring structure represented by the above formula (1) may preferably be, although it is not particularly limited to, a polymer structure unit (i.e., a repeated structure unit) formed by polymerizing at least one kind of monomer selected from the group consisting of (meth)acrylic acid esters, hydroxyl group-containing monomers, unsaturated carboxylic acids, and monomers represented by the following formula (3):

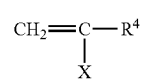

(3)

wherein $R^4$ represents a hydrogen atom or a methyl group, X represents a hydrogen atom, an alkyl group having from 1 to 20 carbon atoms, an aryl group, an —OAc group, a —CN group, a —CO—$R^5$ group, or a —CO—O—$R^6$ group wherein Ac represents an acetyl group and $R^5$ and $R^6$ each independently represents a hydrogen atom or an organic residue having from 1 to 20 carbon atoms, as described later in the production process of the lactone ring-containing polymer.

The content of a structure other than the lactone ring structure represented by the above formula (1) in the structure of the lactone ring-containing polymer may preferably be from 10% to 95% by mass, more preferably from 10% to 90% by mass, still more preferably from 40% to 90% by mass, and particularly preferably from 50% to 90% by mass in the case of a polymer structure unit (i.e., a repeated structure unit) formed by polymerizing a (meth) acrylic acid ester, and may preferably be from 0% to 30% by mass, more preferably from 0% to 20% by mass, still more preferably from 0% to 15% by mass, and particularly preferably from 0% to 10% by mass in the case of a polymer structure unit (i.e., a repeated structure unit) formed by polymerizing a hydroxyl group-containing monomer. Also, the above content may preferably be from 0% to 30% by mass, more preferably from 0% to 20% by mass, still more preferably from 0% to 15% by mass, and particularly preferably from 0% to 10% by mass in the case of a polymer structure unit (i.e., a repeated structure unit) formed by polymerizing an unsaturated carboxylic acid. Further, the above content may preferably be from 0% to 30% by mass, more preferably from 0% to 20% by mass, still more preferably from 0% to 15% by mass, and particularly preferably from 0% to 10% by mass in the case of a polymer structure unit (i.e., a repeated structure unit) formed by polymerizing a monomer represented by the above formula (3).

<Production of Lactone Ring Containing Polymer>

A process for producing a lactone ring-containing polymer is not particularly limited, but polymer (a) having hydroxyl groups and ester groups in the molecular chain thereof is obtained by a polymerization step, and then, the polymer (a) obtained is heat treated to carry out a lactone cyclization condensation step for introducing a lactone ring structure into the polymer, thereby obtaining the lactone ring-containing polymer.

In the polymerization step, for example, a polymer having hydroxyl groups and ester groups in the molecular chain thereof can be obtained by carrying out the polymerization reaction of monomer components containing a monomer represented by the following formula (4):

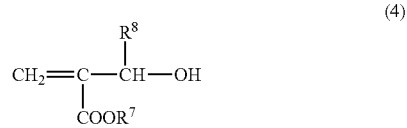

$$CH_2=C(R^8)-CH(OH)-COOR^7 \quad (4)$$

wherein $R^7$ and $R^8$ each independently represents a hydrogen atom or an organic residue having from 1 to 20 carbon atoms.

Examples of the monomer represented by the above formula (4) may include methyl 2-(hydroxy-methyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate. These monomers may be used alone, or two or more kinds of these monomers may also be used in combination. In these monomers, methyl 2-(hydroxymethyl)acrylate and ethyl 2-(hydroxy-methyl)acrylate may be preferred, and methyl 2-(hydroxymethyl)acrylate may particularly be preferred because it exhibits a high effect of improving heat resistance.

The content of the monomer represented by the above formula (4) in the monomer components to be subjected to the polymerization step may preferably be from 5% to 90% by mass, more preferably from 10% to 70% by mass, still more preferably from 10% to 60% by mass, and particularly preferably from 10% to 50% by mass. When the content of the monomer represented by the above formula (4) is smaller than 5% by mass, the polymer obtained may be deteriorated in heat resistance, solvent resistance, and surface hardness. In contrast, when the content of the monomer represented by the above formula (4) is greater than 90% by mass, gelation may occur in the polymerization step or in the lactone cyclization condensation step, and the polymer obtained may be deteriorated in forming processability.

The monomer components to be subjected to the polymerization step may contain a monomer other than the monomers represented by the above formula (4). Examples of such a monomer may include, although it is not particularly limited to, (meth)acrylic acid esters, hydroxyl group-containing monomers, unsaturated carboxylic acids, and monomers represented by the following formula (3):

$$CH_2=C(X)-R^4 \quad (3)$$

wherein $R^4$ represents a hydrogen atom or a methyl group, X represents a hydrogen atom, an alkyl group having from 1 to 20 carbon atoms, an aryl group, an —OAc group, a —CN group, a —CO—$R^5$ group, or a —CO—O—$R^6$ group wherein Ac represents an acetyl group and $R^5$ and $R^6$ each independently represents a hydrogen atom or an organic residue having from 1 to 20 carbon atoms. These monomers may be used alone, or two or more kinds of these monomers may also be used in combination.

The (meth)acrylic acid ester is not particularly limited, so long as it is a (meth)acrylic acid ester other than the monomers represented by the above formula (4). Examples of the (meth)acrylic acid ester may include acrylic acid esters such as methyl acrylate, ethyl acrylate, n-butyl acrylate, isobutyl acrylate, t-butyl acrylate, cyclohexyl acrylate, and benzyl acrylate; and methacrylic acid esters such as methyl methacrylate, ethyl methacrylate, propylmethacrylate, n-butyl methacrylate, isobutyl methacrylate, t-butyl methacrylate, cyclohexyl methacrylate, and benzyl methacrylate. These (meth) acrylic acid esters may be used alone, or two or more kinds of these (meth) acrylic acid esters may also be used in combination. In these (meth)acrylic acid esters, methyl methacrylate may particularly be preferred because the polymer obtained is excellent in heat resistance and transparency.

When a (meth)acrylic acid ester other than the monomers represented by the above formula (4) is used, the content of the (meth)acrylic acid ester in the monomer components to be subjected to the polymerization step may preferably be from 10% to 95% by mass, more preferably from 10% to 90% by mass, still more preferably from 40% to 90% by mass, and particularly preferably from 50% to 90% by mass, in view of sufficiently exhibiting the effect of the present invention.

The hydroxyl group-containing monomer is not particularly limited, so long as it is a hydroxyl group-containing monomer other than the monomers represented by the above formula (4). Examples of the hydroxyl group-containing monomer may include α-hydroxymethyl styrene, α-hydroxyethyl styrene, 2-(hydroxyalkyl)acrylic acid esters such as methyl 2-(hydroxymethyl)acrylate; and 2-(hydroxyalkyl) acrylic acids such as 2-(hydroxyethyl)acrylic acid. These hydroxyl group-containing monomers may be used alone, or two or more kinds of these hydroxyl group-containing monomers may also be used in combination.

When a hydroxyl group-containing monomer other than the monomers represented by the above formula (4) is used, the content of the hydroxyl group-containing monomer in the monomer components to be subjected to the polymerization step may preferably be from 0% to 30% by mass, more preferably from 0% to 20% by mass, still more preferably from 0% to 15% by mass, and particularly preferably from 0% to 10% by mass, in view of sufficiently exhibiting the effect of the present invention.

Examples of the unsaturated carboxylic acid may include acrylic acid, methacrylic acid, crotonic acid, α-substituted acrylic acid, and α-substituted methacrylic acid. These unsaturated carboxylic acids may be used alone, or two or more kinds of these unsaturated carboxylic acids may also be used in combination. In these unsaturated carboxylic acids, acrylic acid and methacrylic acid may particularly be preferred because the effect of the present invention can sufficiently be exhibited.

When an unsaturated carboxylic acid is used, the content of the unsaturated carboxylic acid in the monomer components to be subjected to the polymerization step may preferably be from 0% to 30% by mass, more preferably from 0% to 20% by mass, still more preferably from 0% to 15% by mass, and particularly preferably from 0% to 10% by mass, in view of sufficiently exhibiting the effect of the present invention.

Examples of the monomer represented by the above formula (3) may include styrene, α-methyl styrene, vinyl toluene, acrylonitrile, methyl vinyl ketone, ethylene, propylene, and vinyl acetate. These monomers may be used alone, or two or more kinds of these monomers may also be used in combination. In these monomers, styrene and α-methyl styrene may particularly be preferred because the effect of the present invention can sufficiently be exhibited.

When a monomer represented by the above formula (3) is used, the content of the monomer in the monomer components to be subjected to the polymerization step may preferably be from 0% to 30% by mass, more preferably from 0% to 20% by mass, still more preferably from 0% to 15% by mass, and particularly preferably from 0% to 10% by mass, in view of sufficiently exhibiting the effect of the present invention.

The form of polymerization reaction to obtain a polymer having hydroxyl groups and ester groups in the molecular chain thereof by polymerizing monomer components may preferably be a form of polymerization using a solvent and may particularly preferably be solution polymerization.

Although the polymerization temperature and the polymerization time may vary depending upon the kind and ratio of monomers to be used and the like, for example, the polymerization temperature may preferably be from 0° C. to 150° C. and the polymerization time may preferably be from 0.5 to 20 hours, and the polymerization temperature may more preferably be from 80° C. to 140° C. and the polymerization time may more preferably be from 1 to 10 hours.

In the case of the form of polymerization using a solvent, examples of the polymerization solvent may include, although it is not particularly limited to, aromatic hydrocarbon type solvents such as toluene, xylene, and ethylbenzene; ketone type solvents such as methyl ethyl ketone and methyl isobutyl ketone; and ether type solvents such as tetrahydrofuran. These solvents may be used alone, or two or more kinds of these solvents may also be used in combination. Also, when the boiling point of a solvent is too high, the amount of residual volatile components in the lactone ring-containing polymer finally obtained may become increased, and therefore, solvents having boiling points of from 50° C. to 200° C. may be preferred.

When the polymerization reaction is carried out, a polymerization initiator may be added, if necessary. Examples of the polymerization initiator may include, although it is not particularly limited to, organic peroxides such as cumene hydroperoxide, diisopropylbenzene hydroperoxide, di-t-butyl peroxide, lauroyl peroxide, benzoyl peroxide, t-butyl peroxyisopropylcarbonate, and t-amyl peroxy-2-ethylhexanoate; and azo compounds such as 2,2'-azobis(isobutylonitrile), 1,1'-azobis-(cyclohexanecarbonitrile), and 2,2'-azobis-(2,4-dimethylvaleronitrile). These polymerization initiators may be used alone, or two or more kinds of these polymerization initiators may also be used in combination. The amount of polymerization initiator to be used may appropriately be set depending upon the combination of monomers, the reaction conditions, and the like, although it is not particularly limited.

When the polymerization is carried out, it is preferred to control the concentration of the polymer produced in the polymerization reaction mixture to become 50% by mass or lower in order to prevent the gel formation of the reaction mixture. Specifically, when the concentration of the polymer produced in the polymerization reaction mixture is higher than 50% by mass, it is preferred that the concentration of the polymer is controlled to become 50% by mass or lower by appropriately adding the polymerization solvent to the polymerization reaction mixture. The concentration of the polymer produced in the polymerization reaction mixture may more preferably be 45% by mass or lower and still more preferably 40% by mass or lower. When the concentration of the polymer produced in the polymerization reaction mixture is too low, the productivity may be deteriorated, and therefore, the concentration of the polymer produced in the polymerization reaction mixture may preferably be 10% by mass or higher and more preferably 20% by mass or higher.

The form of appropriate addition of a polymerization solvent to the polymerization reaction mixture is not particularly limited. For example, a polymerization solvent may be added either continuously or intermittently. Thus, it is possible to more sufficiently prevent the gel formation of the reaction mixture by controlling the concentration of the polymer produced in the polymerization reaction mixture in the above manner. Particularly, even in the case of increasing the content of a lactone ring to increase the ratio of hydroxyl groups and ester groups in the molecular chain with the view of improving heat resistance, the gelation can sufficiently be prevented. The polymerization solvent to be added may be either the same as or different from the solvent that is used in the initial charging stage of the polymerization reaction. It is, however, preferred to use the same solvent that is used in the initial charging stage of the polymerization reaction. Also, the polymerization solvent to be added may be either a single solvent composed of only one kind of solvent, or a mixed solvent composed of two or more kinds of solvents.

Although besides the polymer obtained, a solvent may usually be contained in the polymerization reaction mixture obtained when the above polymerization step is finished, it is unnecessary to take out the polymer in solid form by perfectly removing the solvent, but it is preferred to introduce the polymer containing the solvent as it is into the subsequent lactone cyclization condensation step. Also, if necessary, a solvent suitable for the subsequent lactone cyclization condensation step may be added again to the polymer after the polymer is taken out in solid form.

The polymer obtained in the polymerization step is the polymer (a) having hydroxyl groups and ester groups in the molecular chain thereof. The weight average molecular weight of the polymer (a) may preferably be from 1,000 to 2,000,000, more preferably from 5,000 to 1,000,000, still more preferably from 10,000 to 500,000, and particularly preferably from 50,000 to 500,000. The polymer (a) obtained in the polymerization step is heat treated in the subsequent lactone cyclization condensation step, so that a lactone ring structure is introduced into the polymer to produce a lactone ring-containing polymer.

The reaction for introducing a lactone ring structure into the polymer (a) is reaction in which the hydroxyl groups and ester groups present in the molecular chain of the polymer (a) cause cyclization condensation by heating to give a lactone ring structure, and an alcohol is produced as a by-product by the cyclization condensation. The lactone ring structure is formed in the molecular chain of the polymer (i.e., the main backbone of the polymer) to give high heat resistance. When the reaction rate of the cyclization condensation reaction leading a lactone ring structure is insufficient, heat resistance cannot sufficiently be improved in some cases, and the condensation reaction may occur in the middle of forming the polymer by heat treatment when forming the polymer and the produced alcohol may exist in the molded articles while generating bubbles or silver streaks.

The lactone ring-containing polymer obtained in the lactone cyclization condensation step may preferably have a lactone ring structure as a ring structure formed by transesterification, which structure is represented by the following formula (1)

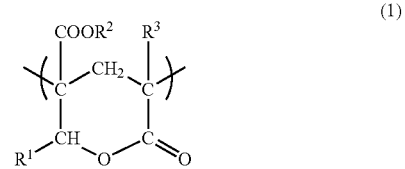

wherein $R^1$, $R^2$, and $R^3$ each independently represents a hydrogen atom or an organic residue having from 1 to 20 carbon atoms, in which the organic residue optionally contains an oxygen atom(s).

The method of heat treating the polymer (a) is not particularly limited, but any of the heretofore known methods may be used. For example, the polymerization reaction mixture containing a solvent, which has been obtained in the polymerization step, may be heat treated as it is. Alternatively, the polymer reaction mixture may be heat treated in the presence of a solvent by using, if necessary, a ring-closing catalyst. Alternatively, the polymer reaction mixture can also be heat treated using a heating furnace or a reaction apparatus, which is equipped with a vacuum apparatus or a devolatilizer for removing volatile components, an extruder equipped with a devolatilizer, or the like.

When the cyclization condensation reaction is carried out, other thermoplastic resins in addition to the polymer (a) may be allowed to coexist. Moreover, when the cyclization condensation reaction is carried out, an esterification catalyst or a transesterification catalyst, such as p-toluenesulfonic acid usually used as a catalyst for the cyclization condensation reaction may be used, if necessary, and an organic carboxylic acid such as acetic acid, propionic acid, benzoic acid, acrylic acid, and methacrylic acid may be used as a catalyst. In addition, for example, as disclosed in Japanese Unexamined Patent Publications Nos. 61-254608 and 61-261303, basic compounds, organic carboxylic acid salts, carbonates, or the like may also be used.

Alternatively, an organophosphorus compound may be used as the catalyst for the cyclization condensation reaction. When the organophosphorus compound is used as the catalyst, the rate of the cyclization condensation reaction can be improved, and the coloring of the lactone ring-containing polymer obtained can remarkably be reduced. Moreover, when the organophosphorus compound is used as the catalyst, a reduction in molecular weight which may probably be caused in the case of using in combination the devolatilization step explained later can be prevented, and it is, therefore, possible to provide high mechanical strength.

Examples of the organophosphorus compound which can be used as the catalyst for the cyclization condensation reaction may include alkyl(aryl)-phosphonous acids (provided that these phosphonous acids may take the form of alkyl(aryl) phosphinic acids which are tautomers), such as methylphosphonous acid, ethylphosphonous acid, and phenylphosphonous acid, and monoesters or diesters of these phosphonous acids; dialkyl(aryl)phosphinic acids such as dimethyl-phosphinic acid, diethylphosphinic acid, diphenylphosphinic acid, phenylmethylphosphinic acid, and phenylethylphosphinic acid, and esters of these phosphinic acids; alkyl(aryl)phosphonic acids such as methylphosphonic acid, ethylphosphonic acid, trifluoromethylphosphonic acid, and phenylphosphonic acid, and monoesters or diesters of these phosphonic acids; alkyl(aryl)phosphinous acids such as methyl-phosphinous acid, ethylphosphinous acid, and phenylphosphinous acid, and esters of these phospinous acids; phosphite monoesters, diesters, or triesters, such as methyl phosphite, ethyl phosphite, phenyl phosphite, dimethyl phosphite, diethyl phosphite, diphenyl phosphite, trimethyl phosphite, triethyl phosphate, and triphenyl phosphite; phosphate monoesters, diesters, or triesters, such as methyl phosphate, ethyl phosphate, 2-ethylhexyl phosphate, octyl phosphate, isodecyl phosphate, lauryl phosphate, stearyl phosphate, isostearyl phosphate, phenyl phosphate, dimethyl phosphate, diethyl phosphate, di-2-ethylhexyl phosphate, diisodecyl phosphate, dilauryl phosphate, distearyl phosphate, diisostearyl phosphate, diphenyl phosphate, trimethyl phosphate, triethyl phosphate, triisodecyl phosphate, trilauryl phosphate, tristearyl phosphate, triisostearyl phosphate, and triphenyl phosphate; mono-, di-, or tri-alkyl(aryl)phosphines, such as methylphosphine, ethylphosphine, phenylphosphine, dimethylphosphine, diethylphosphine, diphenylphosphine, trimethyl-phosphine, triethylphosphine, and triphenylphosphine; alkyl(aryl)halogen phosphines such as methyl-dichlorophosphine, ethyldichlorophosphine, phenyl-dichlorophosphine, dimethylchlorophosphine, diethylchlorophosphine, and diphenylchlorophosphine; mono-, di-, or tri-alkyl(aryl)phosphine oxides, such as methylphosphine oxide, ethylphosphine oxide, phenylphosphine oxide, dimethylphosphine oxide, diethylphosphine oxide, diphenylphosphine oxide, trimethylphosphine oxide, triethylphosphine oxide, and triphenylphosphine oxide; tetraalkyl(aryl)-phosphonium halides such as tetramethylphosphonium chloride, tetraethylphosphonium chloride, and tetraphenylphosphonium chloride. These organophosphorus compounds may be used alone, or two or more kinds of these organophosphorus compounds may also be used in combination. In these organophosphorus compounds, alkyl(aryl)phosphonous acids, phosphite monoesters or diesters, phosphate monoesters or diesters, and alkyl(aryl)phosphonic acids may be preferred, and alkyl(aryl) phosphonous acids, phosphite monoesters or diesters, and phosphate monoesters or diesters may be more preferred, and alkyl(aryl)-phosphonous acids and phosphate monoesters or diesters may particularly be preferred because these organophosphorus compounds have high catalytic activity and low coloring property.

The amount of catalyst to be used in the cyclization condensation reaction is not particularly limited, but, for example, may preferably be from 0.001% to 5% by mass, more preferably from 0.01% to 2.5% by mass, still more preferably from 0.01% to 1% by mass, and particularly preferably from 0.05% to 0.5% by mass, relative to the polymer (a). When the amount of catalyst to be used is smaller than 0.001% by mass, the reaction rate of the cyclization condensation reaction cannot sufficiently be improved in some cases. In contrast, when the amount of catalyst to be used is greater than 5% by mass, the polymer obtained may be colored, and it may become difficult the formation of the polymer by melting because the polymer is cross-linked.

The time of adding the catalyst is not particularly limited, and the catalyst may be added, for example, in the initial stage of the reaction, during the reaction, or at the both times.

It is preferred that the cyclization condensation reaction be carried out in the presence of a solvent and a devolatilization step be combined in the cyclization condensation reaction. In this case, there are cases where the devolatilization step is combined through the whole cyclization condensation reaction and cases where the devolatilization step is not combined through the whole cyclization condensation reaction, but combined only in a part of the reaction. In the method combining the devolatilization step, an alcohol produced as a by-product is forcedly volatilized to remove it, and therefore, the equilibrium of the reaction is advantageously established on the production side.

The devolatilization step means a step of removing volatile components such as a solvent, residual monomers, and an alcohol produced as a by-product by the cyclization condensation reaction introducing a lactone ring structure, if necessary, under the conditions of reduced pressure and heating. When this removing treatment is insufficient, the amounts of residual volatile components in the polymer obtained may be increased, and therefore, coloring may occur by deterioration and formation defects such as bubbles and silver streaks may be generated.

In the case where the devolatilization step is combined through the whole cyclization condensation reaction, the apparatus to be used is not particularly limited, but may preferably be a devolatilizer consisting of a heat exchanger and a devolatilization vessel, an extruder with a vent, or a combination of a devolatilizer and an extruder which are connected in series, more preferably a devolatilizer consisting of a heat exchanger and a devolatilization vessel, or an extruder with a vent.

The reaction treatment temperature when the devolatilizer consisting of a heat exchanger and a devolatilization vessel is used may preferably be from 150° C. to 350° C., more preferably from 200° C. to 300° C. When the reaction treatment temperature is lower than 150° C., the cyclization condensation reaction may become insufficient, and therefore, the amounts of residual volatile components may be increased. In contrast, when the reaction treatment temperature is higher than 350° C., the polymer obtained may be colored or decomposed.

The reaction treatment pressure in the case where the devolatilizer consisting of a heat exchanger and a devolatilization vessel is used may preferably be from 931 to 1.33 hPa (from 700 to 1 mmHg), more preferably from 798 to 66.5 hPa (from 600 to 50 mmHg). When the reaction treatment pressure is higher than 931 hPa (700 mm Hg), volatile components including an alcohol may easily remain. In contrast, when the reaction treatment pressure is lower than 1.33 hPa (1 mm Hg, it may become difficult to carry out the step industrially.

When the extruder with a vent is used, the extruder may be provided with either one vent or two or more vents. It is, however, preferred that the extruder be provided with two or more vents.

The reaction treatment temperature in the case where the extruder with a vent is used may preferably be from 150° C. to 350° C., more preferably from 200° C. to 300° C. When the reaction treatment temperature is lower than 150° C., the cyclization condensation reaction may become insufficient, and the amounts of residual volatile components may be increased. In contrast, when the reaction treatment temperature is higher than 350° C., the polymer obtained may be colored or decomposed.

The reaction treatment pressure in the case where the extruder with a vent is used may preferably be from 931 to 1.33 hPa (from 700 to 1 mmHg), more preferably from 798 to 13.3 hPa (from 600 to 10 mmHg). When the reaction treatment pressure is higher than 931 hPa (700 mmHg), volatile components including an alcohol may easily remain. In contrast, when the reaction treatment pressure is lower than 1.33 hPa (1 mmHg), it may become difficult to carry out the step industrially.

In the case where the devolatilization step is combined through the whole cyclization condensation reaction, the physical properties of the lactone ring-containing polymer obtained may be deteriorated under severe heat treatment conditions as will be explained later. It is, therefore, preferred to carry out the step under as mild conditions as possible by using the above-described catalyst for the dealcoholization reaction in an extruder with a vent.

In the case where the devolatilization step is combined through the whole cyclization condensation reaction, the polymer (a) obtained in the polymerization step may preferably be introduced together with a solvent into a cyclization condensation reaction system. In this case, the polymer (a) may be passed again, if necessary, through a cyclization condensation reaction apparatus such as an extruder with a vent.

The case may be employed where the devolatilization step is not combined through the whole cyclization condensation reaction, but combined in a part of the reaction. For example, such a case is exemplified where the apparatus in which the polymer (a) has been produced is further heated and a part of the devolatilization step is combined, if necessary, to allow the cyclization condensation reaction to proceed in advance to some extent, and then subsequently, the cyclization condensation reaction combined with a devolatilization step at the same time is carried out to complete the reaction.

In the above-described case where the devolatilization step is combined through the whole cyclization condensation reaction, the polymer (a) may partly be decomposed before it undergoes the cyclization condensation reaction due to a difference in thermal hysteresis when the polymer (a) is heat treated at a high temperature around or above 250° C. by using a twin-screw extruder, so that the physical properties of the lactone ring-containing polymer may be deteriorated. For this, when the cyclization condensation reaction is carried out to proceed to some extent in advance before the cyclization condensation reaction combined with the devolatilization step at the same time is carried out, this is preferred because the reaction conditions in the latter half of the reaction can be made milder and a deterioration in the physical properties of the lactone ring-containing polymer obtained can, therefore, be prevented. Particularly preferred cases may include cases where the devolatilization step is started with an interval of certain time after the start of the cyclization condensation reaction, that is, cases where hydroxyl groups and ester groups present in the molecular chain of the polymer (a) obtained in the polymerization step are allowed to undergo cyclization condensation reaction in advance to raise the rate of cyclization condensation reaction to some extent, and subsequently, the cyclization condensation reaction combined with the devolatilization step at the same time is carried out. More specifically, preferred cases may include cases where the cyclization condensation reaction is allowed to proceed to a certain reaction rate in the presence of a solvent in advance in a vessel type reactor and then the cyclization condensation reaction is completed by using a reactor provided with a devolatilizer, for example, a devolatilizer consisting of a heat exchanger and a devolatilization vessel, or an extruder with a vent. Particularly, in these cases, it is more preferred that a catalyst for the cyclization condensation reaction is present.

As described above, the method in which hydroxyl groups and ester groups present in the molecular chain of the polymer (a) obtained in the polymerization step are allowed to undergo cyclization condensation reaction in advance to raise the rate of cyclization condensation reaction to some extent, and subsequently, the cyclization condensation reaction combined with the devolatilization step at the same time is carried out, is a preferred case to obtain a lactone ring-containing polymer in the present invention. This case makes it possible to obtain a lactone ring-containing polymer which has a higher glass transition temperature, which is more improved in the rate of cyclization condensation reaction, and which is excellent in heat resistance. In this case, the standard of the cyclization condensation reaction rate is, for example, as follows: the weight loss rate within a temperature range of from 150° C. to 300° C. in the dynamic TG measurement shown in Examples may preferably be 2% or smaller, more preferably 1.5% or smaller, and still more preferably 1% or smaller.

Examples of the reactor which may be employed in the cyclization condensation reaction carried out in advance before the main cyclization condensation reaction combined with the devolatilization step at the same time is carried out, may include, although it is not particularly limited to, an autoclave, a vessel type reactor, and a devolatilizer consisting of a heat exchanger and a devolatilization vessel. Further, an extruder with a vent which is suitable for the cyclization condensation reaction combined with the devolatilization step at the same time may also be used. In these reactors, an autoclave and a vessel type reactor may particularly be preferred. However, even in the case where a reactor such as an extruder with a vent is used, the cyclization condensation reaction may be carried out under the same reaction conditions as those in the case of an autoclave or a vessel type reactor by making vent conditions milder, avoiding the use of a vent, and controlling temperature conditions, barrel conditions, a screw shape, and screw operating conditions.

In the cyclization condensation reaction carried out in advance before the cyclization condensation reaction combined with the devolatilization step at the same time is carried out, the following methods are given as examples: (i) a method in which a mixture containing the polymer (a) obtained in the polymerization step and a solvent is heated to react by adding a catalyst, (ii) a method in which the above mixture is reacted under heating in the absence of a catalyst, and a method in which the above method (i) or (ii) is carried out under pressure.

The term "a mixture containing the polymer (a) and a solvent" to be introduced into the cyclization condensation reaction in the lactone cyclization condensation step means the polymerization reaction mixture itself obtained in the polymerization step or the mixture obtained by adding a solvent suitable for the cyclization condensation reaction again after the solvent contained in the reaction mixture was removed.

Examples of the solvent which can be added again in the cyclization condensation reaction carried out in advance before the cyclization condensation reaction combined with the devolatilization step at the same time is carried out may include, although it is not particularly limited to, aromatic hydrocarbons such as toluene, xylene, and ethylbenzene; ketones such as methyl ethyl ketone and methyl isobutyl ketone; chloroform, dimethylsulfoxide, and tetrahydrofuran. These solvents may be used alone, or two or more kinds of these solvents may also be used in combination. It is preferred to use the same solvent as that used in the polymerization step.

Examples of the catalyst to be added in the method (i) may include esterification catalysts or ester exchange catalysts such as p-toluenesulfonic acid which are usually used, basic compounds, organic carboxylic acid salts, and carbonates. In the present invention, it is preferred to use the above-described organophosphorus compounds. The time of adding a catalyst is not particularly limited, but the catalyst may be added in the initial stage of the reaction, during the reaction, or at the both times. The amount of catalyst to be added is not particularly limited, but may preferably be from 0.001% to 5% by mass, more preferably from 0.01% to 2.5% by mass, still more preferably from 0.01% to 0.1% by mass, and particularly preferably from 0.05% to 0.5% by mass, relative to the mass of the polymer (a). The heating temperature and heating time in the method (i) are not particularly limited, but the heating temperature may preferably be from room temperature to 300° C., more preferably from 50° C. to 250° C., and the heating time may preferably be from 1 to 20 hours, more preferably from 2 to 10 hours. When the heating temperature is lower than room temperature or the heating time is shorter than 1 hour, the rate of the cyclization condensation reaction may be decreased. When the heating temperature is greater than 300° C. or the heating time is longer than 20 hours, the resin may be colored or decomposed.

The method (ii) may be carried out using a pressure vessel type reactor or the like by heating the polymerization reaction mixture obtained in the polymerization step as it is. The heating temperature and heating time in the method (ii) are not particularly limited, but the heating temperature may preferably be from 100° C. to 350° C., more preferably from 150° C. to 300° C., and the heating time may preferably be from 1 to 20 hours, more preferably from 2 to 10 hours. When the heating temperature is lower than 100° C. or the heating time is shorter than 1 hour, the rate of the cyclization condensation reaction may be decreased. When the heating temperature is higher than 350° C. or the heating time is longer than 20 hours, the resin may be colored or decomposed.

Any of these methods may be carried out under pressure without any problem although depending upon the conditions.

In the cyclization condensation reaction carried out in advance before the cyclization condensation reaction combined with the devolatilization step at the same time is carried out, a part of the solvent may be allowed to vaporize naturally during the reaction without any problem.

The weight loss rate within a temperature range of from 150° C. to 300° C. in the measurement of dynamic TG may preferably be 2% or lower, more preferably 1.5% or lower, and still more preferably 1% or lower, when the cyclization condensation reaction carried out in advance before the cyclization condensation reaction combined with the devolatilization step at the same time is completed, that is, just before the start of the devolatilization step. When the weight loss rate is higher than 2%, the cyclization condensation reaction rate cannot sufficiently be increased to a high level in some cases, even if the cyclization condensation reaction combined the devolatilization step at the same time is subsequently carried out, and therefore, the physical properties of the lactone ring-containing polymer obtained may be deteriorated. In addition to the polymer (a), any other thermoplastic resin is allowed to exist when the above cyclization condensation reaction is carried out.

In the case where hydroxyl groups and ester groups present in the molecular chain of the polymer (a) obtained in the polymerization step are allowed to undergo cyclization condensation reaction in advance to raise the rate of cyclization condensation reaction to some extent, and subsequently, the cyclization condensation reaction combined with the devolatilization step at the same time is carried out, the polymer (i.e., a polymer in which at least a part of the hydroxyl groups and ester groups present in the molecular chain have caused cyclization condensation reaction) obtained in advance by the cyclization condensation reaction and the solvent may be introduced into the cyclization condensation reaction combined with the devolatilization step at the same time either as it is or after, if necessary, the above polymer (i.e., a polymer in which at least a part of the hydroxyl groups and ester groups have caused cyclization condensation reaction) is isolated and other treatments are carried out, for example, a solvent is added again.

The devolatilization step may be unnecessarily finished simultaneously when the cyclization condensation reaction is completed, but may be finished with an interval of certain time after the cyclization condensation reaction is finished.

<Physical Properties of Lactone Ring-Containing Polymer>

The weight average molecular weight of the lactone ring-containing polymer may preferably be from 1,000 to 2,000, 000, more preferably from 5,000 to 1,000,000, still more preferably from 10,000 to 500,000, and particularly preferably from 50,000 to 500,000.

The lactone ring-containing polymer may preferably have a weight loss rate of 1% or lower, more preferably 0.5% or lower, and still more preferably 0.3% or lower in a temperature range of from 150° C. to 300° C. in the measurement of dynamic TG.

The lactone ring-containing polymer has a high cyclization condensation reaction rate, and it is, therefore, possible to avoid the defect that the molded article obtained after formation has bubbles or silver streaks. Moreover, a lactone ring structure can sufficiently be introduced into the polymer, so that the lactone ring-containing polymer obtained can have sufficiently high heat resistance.

When a chloroform solution containing the lactone ring-containing polymer in a concentration of 15% by mass is prepared, the degree of coloration (YI) of the solution may preferably be 6 or lower, more preferably 3 or lower, still more preferably 2 or lower, and particularly preferably 1 or lower. When the degree of coloration (YI) is higher than 6, the transparency may be damaged by coloration, and therefore, the polymer cannot be used in the originally intended applications.

The 5% weight loss temperature of the lactone ring-containing polymer in the thermogravimetric analysis (TG) may preferably be 330° C. or higher, more preferably 350° C. or higher, and still more preferably 360° C. or higher. The 5% weight loss temperature in the thermogravimetric analysis (TG) is an index of thermal stability, and when it is lower than 330° C., sufficient thermal stability cannot be exhibited in some cases.

The glass transition temperature (Tg) of the lactone ring-containing polymer may preferably be 115° C. or higher, more preferably 125° C. or higher, still more preferably 130° C. or higher. The upper limit of the glass transition temperature (Tg) may particularly be, although it is not particularly limited to, 170° C., more preferably 160° C., and still more preferably 150° C. The glass transition temperature (Tg) of the lactone ring-containing polymer is a value determined by a middle point method according to ASTM-D-3418.

The total amount of residual volatile components contained in the lactone ring-containing polymer may preferably be 1,500 ppm or smaller, more preferably 1,000 ppm or smaller. When the total amount of residual volatile components is greater than 1,500 ppm, this becomes a cause of formation defects such as coloring, bubbling, and silver streaks, all of which are caused by denaturation of the polymer during molding and the like.

In the applications requiring transparency, the total light transmittance of a molded article obtained by injection molding of the lactone ring-containing polymer may preferably be 85% or higher, more preferably 88% or higher, and still more preferably 90% or higher, when measured by a method according to ASTM-D-1003. The total light transmittance is an index of transparency, and when the total light transmittance is lower than 85%, transparency is decreased, and therefore, the molded article cannot be used in the applications requiring transparency.

<Amount of Lactone Ring-Containing Polymer>

The amount of the lactone ring-containing polymer to be mixed in the thermoplastic resin composition of the present invention may appropriately be adjusted according to the application of the composition, and for example, it may preferably be, although it is not particularly limited to, from 50% to 100% by mass, more preferably from 60% to 100% by mass, still more preferably from 70% to 100% by mass, and particularly preferably 80% to 100% by mass. When the amount of the lactone ring-containing polymer is smaller than 50% by mass, desired characteristics such as mechanical strength and forming processability in addition to excellent transparency and high heat resistance cannot be exhibited in some cases.

<Other Components>

The thermoplastic resin composition of the present invention may contain a polymer (hereinafter referred to sometimes as "at least one other polymer") other than the lactone ring-containing polymer as at least one other component. Examples of the at least one other polymer may include olefin type polymers such as polyethylene, polypropylene, ethylene-propylene copolymers, and poly(4-methyl-1-pentene); vinyl halide type polymers such as polyvinyl chloride, polyvinylidene chloride, and chlorinated vinyl resins; acrylic type polymers such as polymethyl methacrylate; styrene type polymers such as polystyrene, styrene-methyl methacrylate copolymers, styrene-acrylonitrile copolymers, and acrylonitrile-butadiene-styrene block copolymers; polyesters such as polyethylene terephthalate, polybutylene terephthalate, polyethylene naphthalate, polylactic acid, and polybutylene succinate; polyamides such as nylon 6, nylon 66, and nylon 610; polyacetals; polycarbonates; polyphenylene oxides; polyphenylene sulfides; polyether ether ketones; polysulfones; polyether sulfones; polyoxybenzylenes; polyamide-imides; rubber like polymers such as ABS resins and ASA resins mixed with polybutadiene type rubbers or acrylic type rubbers.

The amount of at least one other polymer to be mixed in the thermoplastic resin composition of the present invention may appropriately be adjusted according to the application of the composition, and for example, it may preferably be, although it is not particularly limited to, from 0% to 50% by mass, more preferably from 0% to 40% by mass, still more preferably from 0% to 30% by mass, and particularly preferably from 0% to 20% by mass.

The thermoplastic resin composition of the present invention may contain various additives. Examples of the additives may include antioxidants such as those of the hindered phenol type, those of the phosphorus type, and those of the sulfur type; stabilizers such as light stabilizers, weather stabilizers, and thermal stabilizers; reinforcing materials such as glass fibers and carbon fibers; ultraviolet absorbers such as phenyl salicylate, (2,2'-hydroxy-5-methylphenyl)-benzotriazole, and 2-hydroxybenzophenone; near-infrared absorbers; flame retardants such as tris(dibromopropyl) phosphate, triaryl phosphate, and antimony oxide; antistatic agents such as surfactants of the anionic type, surfactants of the cationic type, and surfactants of the nonionic type; colorants such as inorganic pigments, organic pigments, and dyes; organic fillers and inorganic fillers; resin modifiers; organic filling agents and inorganic filling agents; plasticizers; and lubricants.

The amount of the additives to be mixed in the thermoplastic resin composition of the present invention may appropriately be adjusted according to the application of the composition, and for example, it may preferably be, although it is not particularly limited to, from 0% to 5% by mass, more preferably from 0% to 2% by mass, and still more preferably from 0% to 0.5% by mass.

<<Deactivator>>

For example, when a lactone ring-containing polymer is used as a methacrylic resin, as described above, in the lactone cyclization condensation step, the hydroxyl groups and the ester groups present in the molecular chain of the polymer (a) are cyclized and condensed to cause dealcoholization reaction, which is one kind of transesterification, and as a result, the lactone ring structure is formed in the molecular chain of the polymer (i.e., in the main backbone of the polymer). In general, when the catalyst used in the transesterification is an acidic material, the catalyst remaining after the reaction can be deactivated by neutralizing it using a basic material. Therefore, the deactivator used in this case is not particularly limited so long as it is a basic material and it does not produce such a material that inhibits the resin composition at the time of thermal processing. Examples of the deactivator may include metal compounds such as metal salts, metal complexes, and metal oxides. The metals constituting the metal compounds are not particularly limited, so long as they do not inhibit the physical properties and the like of the resin composition and do not cause environmental pollution when being abandoned. Examples of the metals may include alkaline metals such as lithium, sodium, and potassium; alkaline earth metals such as magnesium, calcium, strontium, and barium; amphoteric metals such as zinc, aluminum, tin, and lead; and zirconium. In these metals, because of low coloring of the resin, representative metal elements may be preferred, alkaline earth metals and amphoteric metals may be preferred, and calcium, magnesium and zinc may be most preferred. The metal salts may preferably be metal salts of organic acids, particularly preferably metal salts of organic carboxylic acids, organophosphorus compounds, and acidic organosulfur compounds, in view of dispersibility in the resin and solubility in the solvent. Examples of the organic carboxylic acids forming metal salts of organic carboxylic acids may include, although they are not particularly limited to, formic acid, acetic acid, propionic acid, butyric acid, valeric acid, hexanoic acid, heptanoic acid, octanoic acid, nonanoic acid, decanoic acid, lauric acid, myristic acid, palmitic acid, stearic acid, behenic acid, tridecanoic acid, pentadecanoic acid, heptadecanoic acid, lactic acid, malic acid, citric acid, oxalic acid, malonic acid, succinic acid, fumaric acid, maleic acid, and adipic acid. Examples of the organophosphorus compounds forming metal salts of organophosphorus compounds may include alkyl(aryl)phosphonous acids (provided that these phosphonous acids may take the form of alkyl(aryl) phosphinic acids which are tautomers), such as methylphosphonous acid, ethylphosphonous acid, and phenylphosphonous acid, and monoesters or diesters of these phosphonous acids; dialkyl (aryl) phosphinic acids such as dimethylphosphinic acid, diethylphosphinic acid, diphenylphosphinic acid, phenylmethylphosphinic acid, and phenylethylphosphinic acid, and esters of these phosphinic acids; alkyl(aryl)phosphonic acids such as methylphosphonic acid, ethylphosphonic acid, trifluoromethylphosphonic acid, and phenylphosphonic acid, and monoesters or diesters of these phosphonic acids; alkyl(aryl)phosphinous acids such as methylphosphinous acid, ethylphosphinous acid, and phenylphosphinous acid, and esters of these phospinous acids; phosphite monoesters, diesters, or triesters, such as methyl phosphite, ethyl phosphite, phenyl phosphite, dimethyl phosphite, diethyl phosphite, diphenyl phosphite, trimethyl phosphite, triethyl phosphate, and triphenyl phosphite; phosphate monoesters, diesters, or triesters, such as methyl phosphate, ethyl phosphate, 2-ethylhexyl phosphate, octyl phosphate, isodecyl phosphate, lauryl phosphate, stearyl phosphate, isostearyl phosphate, phenyl phosphate, dimethyl phosphate, diethyl phosphate, di-2-ethylhexyl phosphate, diisodecyl phosphate, dilauryl phosphate, distearyl phosphate, diisostearyl phosphate, diphenyl phosphate, trimethyl phosphate, triethyl phosphate, triisodecyl phosphate, trilauryl phosphate, tristearyl phosphate, triisostearyl phosphate, and triphenyl phosphate; mono-, di-, or tri-alkyl(aryl)phosphines, such as methylphosphine, ethylphosphine, phenylphosphine, dimethylphosphine, diethylphosphine, diphenylphosphine, trimethyl-phosphine, triethylphosphine, and triphenylphosphine; alkyl(aryl)halogen phosphines such as methyl-dichlorophosphine, ethyldichlorophosphine, phenyl-dichlorophosphine, dimethylchlorophosphine, diethylchlorophosphine, and diphenylchlorophosphine; mono-, di-, or tri-alkyl(aryl)phosphine oxides, such as methylphosphine oxide, ethylphosphine oxide, phenylphosphine oxide, dimethylphosphine oxide, diethylphosphine oxide, diphenylphosphine oxide, trimethylphosphineoxide, triethylphosphineoxide, and triphenylphosphine oxide; tetraalkyl(aryl)-phosphonium halides such as tetramethylphosphonium chloride, tetraethylphosphonium chloride, and tetraphenylphosphonium chloride. Examples of the acidic organosulfur compounds forming metal salts of acidic organosulfur compounds may include p-toluenesulfonic acid, methanesulfonic acid, benzenesulfonic acid, xylenesulfonic acid, and dodecylbenzenesulfonic acid. Examples of the organic components in the metal complexes may include, although they are not particularly limited to, acetylacetone. On the other hand, when the catalyst used in the transesterification is a basic material, the catalyst remaining after the reaction may be deactivated with, for example, an acidic material such as an organophosphorus compound. In either case, these deactivators may be used alone, or two or more kinds of these deactivators may be used in combination. The deactivator may be added in any form, for example, as a solid, a powder, a grain, a dispersion, a suspension, an aqueous solution, or the like, and the form of the deactivator is not particularly limited.

The amount of the deactivator to be added may appropriately be adjusted according to the amount of the catalyst used in the transesterification, and for example, it may preferably be, although it is not particularly limited, from 10 to 10,000 ppm, more preferably from 50 to 5,000 ppm, and still more preferably from 100 to 3,000 ppm, based on the mass of the methacrylic resin. When the amount of the deactivator to be added is smaller than 10 ppm, the action of the deactivator becomes insufficient, and bubbles or silver streaks may enter into the molded articles. In contrast, when the amount of the deactivator to be added is greater than 10,000 ppm, the action of the deactivator may be saturated and the deactivator may be used more than necessary, which may cause an increase in production cost.

The time of adding a deactivator is not particularly limited, so long as it is after a ring structure is formed by cyclization condensation reaction in the production of a methacrylic resin and before the resin composition obtained is subjected to thermal processing. For example, the following methods are given as examples: a method in which a deactivator is added at a specific stage in the production of a methacrylic resin; a method in which after the production of a methacrylic resin, the methacrylic resin, the deactivator, other components, and the like are kneaded by melt blending at the same time; a method in which the methacrylic resin, other components, and the like are heated and melted in advance, and then the deactivator is added, followed by kneading; and a method in which the methacrylic resin is heated and melted in advance, and then the deactivator, other components, and the like are added, followed by kneading. In these cases, it is preferred that the devolatilization step is provided after the thermoplastic resin composition is kneaded. It is because a bubbling phenomenon is hardly caused when the thermoplastic resin composition obtained is subjected to thermal processing. Examples of the devolatilization step may include devolatilization steps described above as the devolatilization steps used in the production of the lactone ring-containing polymer.

<<Characteristics of Thermoplastic Resin Composition>>

The thermoplastic resin composition of the present invention causes no bubbling phenomenon at the time of thermal processing because even if the catalyst used in the transesterification remains, it is in a very small amount and most of the catalyst has been deactivated. In fact, the amount of bubbles generated when this thermoplastic resin composition is heated at 260° C. for 20 minutes may preferably be 20 pieces/g or smaller, more preferably 15 pieces/g or smaller, still more preferably 10 pieces/g or smaller, and particularly preferably 5 pieces/g or smaller.

The amount of bubbles is measured with a melt indexer defined in JIS-K7210. More specifically, the amount of bubbles is expressed as pieces of bubbles per one gram of the thermoplastic resin composition, which is determined as follows: the dried thermoplastic resin composition is filled in a cylinder of the melt indexer and is kept at 260° C. for 20 minutes, followed by the extrusion of the resin composition in a strand form, and the generation number of bubbles present between the upper marked line and the lower marked line on the strand obtained is counted.

<<Applications and Formation of Thermoplastic Resin Composition>>

The thermoplastic resin composition of the present invention is excellent in transparency and heat resistance and has desired properties such as mechanical strength and forming processability, and therefore, it has a very wide variety of applications including, for example, signboards and displays, light electrical appliances and industrial components, car parts centered on automobiles, building materials and shop decorations, coating materials, protective films for paint peeling off, lighting equipments, large-scale water tanks, optical lenses, optical prisms, optical films, optical fibers, optical disks, and miscellaneous goods such as mirrors, stationeries, and table wares. In these applications, optical lenses, optical prisms, optical films, optical fibers, optical disks, and the like may particularly be preferred.

The thermoplastic resin composition of the present invention can be formed into various shapes according to the applications. Examples of the shapes which can be formed may include films, seats, plates, disks, blocks, balls, lenses, rods, strands, codes, and fibers. The forming method may appropriately be selected according to the shape from the heretofore known forming methods, and it is not particularly limited.

Taking an optical film, which is a particularly preferred application, as one example, the method of producing an optical film from the thermoplastic resin composition of the present invention will be described below in detail.

<Production of Optical Film>

In order to produce an optical film from the thermoplastic resin composition of the present invention, for example, the film raw materials are pre-blended by using any of the heretofore known mixers such as an omni mixer and then the mixture obtained is extrusion-kneaded. In this case, the kneader used for the extrusion kneading is not particularly limited, but any of the heretofore known kneaders, for example, extruders such as single screw extruders and twin-screw extruders, and pressure kneaders.

As the method of forming a film, there may be used any of the heretofore known film formation methods such as solution casting methods, melt extrusion methods, calendering methods, and compression formation methods. In these film formation methods, solution casting methods and melt extrusion methods may particularly be preferred.

Examples of the solvent to be used in the solution casting method may include aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethylformamide; and dimethyl sulfoxide. These solvents may be used alone, or two or more kinds of these solvents may be used in combination.

Examples of the apparatus used to carry out the solution casting method may include drum type casting machines, band type casting machines, and spin coaters.

Examples of the melt extrusion method may include T-die methods and inflation methods. At this time, the film formation temperature may appropriately be adjusted according to the glass transition temperature of the film raw materials, and it may preferably be, although it is not particularly limited to, from 150° C. to 350° C., more preferably 200° C. to 300° C.

When the film is formed by a T-die method, a T-die is set to the top end of a known single screw extruder or twin-screw extruder, and a film extruded in a film form may be rolled to obtain a rolled film. At this time, it is possible to carry out a uniaxial stretching by appropriately controlling the temperature of wind-up rolls to stretch the film in the direction of extrusion. It is also possible to carry out stretching such as sequential biaxial stretching or simultaneous biaxial stretching by stretching the film in a direction perpendicular to the direction of extrusion.

The film formed from the thermoplastic resin composition of the present invention may be either a non-stretched film or a stretched film. When the film is a stretched film, it is either a uniaxial stretched film or a biaxial stretched film. When the film is a biaxial stretched film, it may be either a simultaneously biaxially stretched film or a sequentially biaxially stretched film. When biaxially stretched, the film has improved mechanical strength, leading to an improvement in the performance of the film. When at least one other thermoplastic resin is mixed in the thermoplastic resin composition of the present invention, an increase in the retardation of the film can be prevented and the optical isotropy of the film can be retained, even if the film is stretched.

The stretching temperature may preferably be around the glass transition temperature of the thermoplastic resin composition as a film raw material. The specific stretching temperature may preferably be from (glass transition temperature−30° C.) to (glass transition temperature+100° C.), more preferably from (glass transition temperature−20° C.) to (glass transition temperature+80° C.). When the stretching temperature is lower than (glass transition temperature−30° C.), sufficient stretching ratio cannot be obtained in some cases. In contrast, when the stretching temperature is higher than (glass transition temperature+100° C.), the resin may be fluidized, which makes it impossible to carry out stable stretching.

The stretching ratio defined by an area ratio may preferably be from 1.1 to 25, more preferably from 1.3 to 10. When the stretching ratio is smaller than 1.1, no improvement in toughness due to stretching may be obtained. In contrast, when the stretching ratio is greater than 25, no effect with an increase in stretching ratio can be observed.

The stretching speed may preferably be from 10%/min. to 20,000%/min., more preferably from 100%/min. to 10,000%/min., in one direction. If the stretching speed is lower than 10%/min., it may take time to obtain a sufficient stretching ratio, which raises the production cost. In contrast, if the stretching speed is higher than 20,000%/min., the stretched film may be broken, for example.

As for the film formed from the thermoplastic resin composition of the present invention, to stabilize the optical isotropy and mechanical characteristics of the film, heat treatment (annealing) may also be carried out after the stretching treatment. The conditions of heat treatment may appropriately be selected in the same manner as those of heat treatment carried out for any of the heretofore known stretched films, and they are not particularly limited.

The thickness of the film formed from the thermoplastic resin composition of the present invention may preferably be from 5 to 200 μm, and more preferably from 10 to 100 μm. When the thickness is smaller than 5 μm, the strength of the film is decreased, and when the film is attached to other parts and the durability is examined, crispation may become large. In contrast, when the thickness is greater than 200 μm, the transparency of the film is decreased, and the moisture permeability of the film becomes small, so that if a water type adhesive is used when the film is attached to other parts, the drying speed of water which is the solvent may become slow.

The wetting tension on the surface of the film formed from the thermoplastic resin composition of the present invention may preferably be 40 mN/m or higher, more preferably 50 mN/m or higher, and still more preferably 55 mN/m or higher. When the wetting tension on the surface is at least 40 mN/m or higher, the adhesive strength between the film formed from the thermoplastic resin composition of the present invention and other parts may further be improved. In order to adjust the wetting tension on the surface, for example, there can be carried out any of the heretofore known surface treatments such as corona discharge treatment, ozone spraying, ultraviolet ray irradiation, flame treatment, and chemical treatment.

EXAMPLES

The present invention will be described below in more detail by way of Examples, but the present invention is not limited to the following Examples. The present invention can be put into practice after appropriate modifications or variations within a range meeting the gists described above and later, all of which are included in the technical scope of the present invention.

First, the method of evaluating the methacrylic resin having a ring structure in the main chain thereof (hereafter referred to as "the polymer") will be described.

<Polymerization Reaction Rate and Polymer Composition Analysis>

The reaction rate in the polymerization reaction and the contents of specific monomer units in a polymer were determined by measuring the amounts of unreacted monomers in the resulting polymerization reaction mixture using gas chromatography (GC17A, available from Shimadzu Corporation).

<Dynamic TG>

The polymer (or a polymer solution or polymer pellets) was once dissolved in or diluted with tetrahydrofuran, which was then poured into excess hexane or methanol to cause reprecipitation. The precipitate taken out from the solution was dried under vacuum (1 mmHg (1.33 hPa), 80° C., 3 hours or longer) to remove volatile components. The resulting resin having a white solid form was analyzed by the following method (dynamic TG method).

Measuring apparatus: Differential type differential thermobalance (Thermo Plus 2 TG-8120 Dynamic TG, available from Rigaku Corporation)

Measuring condition: Sample amount: from 5 to 10 mg

Temperature rise rate: 10° C./min.

Atmosphere: Nitrogen flow, 200 mL/min.

Method: Stepped isothermal control method (weight loss rate within a temperature range of from 60° C. to 500° C. was controlled to 0.005%/s or smaller)

<Content of Ring Structure>

First, the weight loss when all hydroxyl groups were removed as methanol from the resulting polymer composition by dealcoholization was defined as the standard, and then, a dealcoholization reaction rate was determined from the weight loss in the dealcoholization reaction within a temperature range of from 150° C. before the start of weight loss to 300° C. before the start of the decomposition of the polymer in the dynamic TG measurement.

More specifically, a weight loss rate within a temperature range of from 150° C. to 300° C. is measured in the dynamic TG measurement of the polymer having a ring structure in the main chain thereof, and the measured actual value is defined as an actual weight loss rate (X). On the other hand, the weight loss rate is calculated from the composition of the polymer on the premise that all hydroxyl groups contained in the polymer composition are converted into alcohols to participate in the formation of a ring structure and then dealcoholized (specifically, the weight loss rate calculated on the premise that 100% of the alcohols in the composition undergoes dealcoholization reaction) is defined as a theoretical weight loss rate (Y). The theoretical weight loss rate (Y) may be calculated more specifically from the molar ratio of the raw material monomer having a structure (i.e., hydroxyl groups) participating in the dealcoholization reaction in the polymer, that is, from the content of the raw material monomer in the polymer composition. In the following equation of dealcoholization, the above values are substituted to calculate and the obtained value is noted by percentage, thereby obtaining the rate of dealcoholization reaction.

1−(Actual weight loss rate ($X$)/Theoretical weight loss rate ($Y$))

As one example, there will be calculated the proportion of the lactone ring structure in the pellets obtained in Production Example 1 explained later. To determine the theoretical weight loss rate (Y), the content of methyl 2-(hydroxymethyl) acrylate in the polymer is as follows: (32/116)×20.0≅5.52% by mass since the molecular weight of methanol is 32, the molecular weight of methyl 2-(hydroxymethyl)acrylate is 116, and the content (by mass ratio) of methyl 2-(hydroxymethyl)acrylate is 20.0% by mass from the composition. On the other hand, the actual weight loss rate (X) determined by dynamic TG measurement was 0.17% by mass. Substituting these values in the above dealcoholization equation, 1−(0.17/5.52)=0.969, and thus, the dealcoholization reaction rate is 96.9%. Then, on the assumption that lactone cyclization may occur corresponding to this rate of dealcoholization reaction, the proportion of the lactone ring structure in the copolymer can be calculated by multiplying the content (mass ratio), in the copolymer, of a raw material monomer with a structure (i.e., hydroxyl groups) involved in the lactone cyclization by the rate of dealcoholization and then converting the product into the content (mass ratio) of the lactone ring structure. In the case of Production Example 1, the content of methyl 2-(hydroxymethyl)acrylate in the copolymer was 20.0% by mass, the calculated rate of dealcoholization is 96.9% by mass, the formula mass of the lactone ring structure is 170, which structure is formed when methyl 2-(hydroxymethyl) acrylate having a molecular weight of 116 is condensed with methylmethacrylate, and therefore, the proportion of the lactone ring structure in the copolymer becomes 28.4% (=20.0%×0.969×170/116) by mass.

<Weight Average Molecular Weight>

The weight average molecular weight of the polymer was determined in terms of polystyrene using gel permeation chromatography (GPC System, available from Tosoh Corporation).

<Melt Flow Rate>

The melt flow rate was measured at a test temperature of 240° C. under a load of 10 kg according to JIS-K6874.

<Thermal Analysis of Polymer>

The thermal analysis of the polymer was made using a differential scanning calorimeter (DSC-8230, available from Rigaku Corporation) on the following conditions: sample amount, 10 mg; temperature rise rate, 10° C./min.; and nitrogen flow, 50 mL/min. The glass transition temperature (Tg) was determined by a middle point method according to ASTM-D-3418.

<Measurement of Amount of Bubbles>

The amount of bubbles was measured for molded articles in a strand form. The dried thermoplastic resin composition was filled in a cylinder of the melt indexer defined in JIS-K7210 and was kept at 260° C. for 20 minutes, followed by the extrusion of the resin composition in a strand form, and the generation number of bubbles present between the upper marked line and the lower marked line on the strand obtained was counted and expressed as pieces of bubbles per one gram of the thermoplastic resin composition.

<Content of Metal Compound>

The content of the metal compound was measured using a 2.5 wt % solution containing the thermoplastic resin composition dissolved in methyl ethyl ketone as a sample and with an ICP emission spectrophotometer (CIROS CCD, available from Rigaku Corporation) in terms of metal atom, that is, as the content of metal atom contained in the metal compound added.

Production Example 1

First, a 30 L reaction vessel equipped with a stirrer, a temperature sensor, a condenser tube, and a nitrogen introduction pipe was charged with 8 kg of methyl methacrylate, 2 kg of methyl 2-(hydroxymethyl)-acrylate, 10 kg of methyl isobutyl ketone, and 5 g of n-dodecylmercaptan.

The mixture was heated to 105° C. under a nitrogen gas stream to cause reflux, at which 5 g of t-butylperoxyisopropyl carbonate (KAYACARBON BIC-75, available from Chemical Akzo Co., Ltd.) was added as a polymerization initiator, and at the same time, solution polymerization was carried out under reflux at from about 105° C. to 120° C., while a solution containing 10 g of t-butylperoxyisopropyl carbonate (KAYACARBON BIC-75, available from Chemical Akzo Co., Ltd.) dissolved in 230 g of methyl isobutyl ketone was added dropwise over 2 hours. The reaction mixture was then aged over further 4 hours.

Then, 30 g of a mixture of stearyl phosphate and distearylphosphate (Phoslex A-18, available from Sakai Chemical Industry Co., Ltd.) was added to the polymer solution obtained, which was allowed to cause cyclization condensation reaction under reflux at from about 90° C. to 120° C. for 5 hours. Then, the polymer solution obtained was introduced at a treatment rate of 2.0 kg/h on the resin basis into a vent type screw twin-screw extruder (φ=29.75 mm, L/D=30) on the following conditions: barrel temperature, 260° C.; revolution number, 100 rpm; degree of vacuum, from 13.3 to 400 hPa (from 10 to 300 mmHg); the number of rear vents, 1; and the number of fore vents, 4. In this extruder, the polymer solution was further allowed to cause cyclization condensation reaction and devolatilization, and then extruded to obtain transparent pellets of lactone ring-containing polymer (A).

When the dynamic TG measurement was carried out for the lactone ring-containing polymer, a weight loss of 0.17% by mass was detected. Moreover, the lactone ring-containing polymer had a weight average molecular weight of 133,000, a melt flow rate of 6.5 g/10 min., and a glass transition temperature of 131° C.

Production Example 2

First, a 1 m$^3$ reaction vessel equipped with a stirrer, a temperature sensor, a condenser tube, and a nitrogen introduction pipe was charged with 136 kg of methyl methacrylate, 34 kg of methyl 2-(hydroxy-methyl)acrylate, and 166 kg of toluene.

The mixture was heated to 105° C. under a nitrogen gas stream to cause reflux, at which 187 g of t-amyl-peroxyisononanoate (Lupasol 570, available from Arkema Yoshitomi Ltd.) was added as a polymerization initiator, and at the same time, solution polymerization was carried out under reflux at from 105° C. to 110° C., while a solution containing 374 g of t-amylperoxyisononanoate (Lupasol 570, available from Arkema Yoshitomi Ltd.) dissolved in 3.6 kg of toluene was added dropwise over 2 hours. The reaction mixture was then aged over further 4 hours.

Then, 170 g of a mixture of stearyl phosphate and distearyl phosphate (Phoslex A-18, available from Sakai Chemical Industry Co., Ltd.) was added to the polymer solution obtained, which was allowed to cause cyclization condensation reaction under reflux at from about 90° C. to 110° C. for 5 hours. Then, the polymer solution obtained was introduced at a treatment rate of 13 kg/h on the resin basis into a vent type screw twin-screw extruder (φ=42 mm, L/D=42) on the following conditions: barrel temperature, 250° C.; revolution number, 150 rpm; degree of vacuum, from 13.3 to 400 hPa (from 10 to 300 mmHg); the number of rear vents, 1; and the number of fore vents, 4. In this extruder, the polymer solution was further allowed to cause cyclization condensation reaction and devolatilization, and then extruded to obtain transparent pellets of lactone ring-containing polymer (B).

When the dynamic TG measurement was carried out for the lactone ring-containing polymer, a weight loss of 0.15% by mass was detected. Moreover, the lactone ring-containing polymer had a weight average molecular weight of 147,000, a melt flow rate of 11.0 g/10 min., and a glass transition temperature of 130° C.

Example 1

Using a twin-screw extruder (φ=20 mm, L/D=25) zinc oxide (Nanofine, available from Sakai Chemical Industry Co., Ltd.) in an amount of 500 ppm relative to the amount of the polymer was added to the pellets (A) obtained in Production Example 1, and the mixture was kneaded and extruded at 270° C. to obtain transparent pellets (A1) of a thermoplastic resin composition.

The pellets (A1) obtained were fed to a melt indexer set at 260° C. and then kept for 20 minutes, followed by extrusion in a strand form under a load of 10 kg. At this time, the amount of bubbles was 0 piece/g. In addition, the content of the metal compound was 377 ppm in terms of metal atom based on the mass of the polymer. The results are shown in Table 1.

Example 2

Pellets (A2) of a thermoplastic resin composition were obtained in the same manner as described in Example 1, except that 1,000 ppm of calcium stearate (Daiwax C, available from Dainichi Chemical Industry Co., Ltd.) was added instead of 500 ppm of zinc oxide.

The pellets (A2) obtained were extruded in the same manner as described in Example 1. At this time, the amount of bubbles was 1.3 pieces/g. In addition, the content of the metal compound was 58 ppm in terms of metal atom based on the mass of the polymer. The results are shown in Table 1.

Example 3

Pellets (A3) of a thermoplastic resin composition were obtained in the same manner as described in Example 1, except that 2,000 ppm of zinc 2-ethylhexanoate (Nikka Octix Zinc 18%, available from Nihon Kagaku Sangyo Co., Ltd.) was added instead of 500 ppm of zinc oxide.

The pellets (A3) obtained were extruded in the same manner as described in Example 1. At this time, the amount of bubbles was 2 pieces/g. In addition, the content of the metal compound was 320 ppm in terms of metal atom based on the mass of the polymer. The results are shown in Table 1.

Comparative Example 1

Pellets (A0) of a thermoplastic resin composition were obtained in the same manner as described in Example 1, except that zinc oxide was not added.

The pellets (A0) obtained were extruded in the same manner as described in Example 1. At this time, no fine molded article in a strand form was obtained because of the occurrence of bubbling. The amount of bubbles was 33.3 pieces/g. In addition, the content of the metal compound was 0 ppm in terms of metal atom based on the mass of the polymer. The results are shown in Table 1.

Example 4

Using a twin-screw extruder ($\phi$=30 mm, L/D=30) having vent ports, zinc acetate in an amount of 1,200 ppm relative to the amount of the polymer was added to the pellets (A) obtained in Production Example 1, and the mixture was kneaded and extruded at 260° C. while sucking from the vent ports to obtain transparent pellets (A4) of a thermoplastic resin composition.

The pellets (A4) obtained were fed to an injection molding machine (model HM7, available from Nissei Plastic Industrial Co., Ltd.) in which the barrel temperature was set at 260° C., and then kept for 20 minutes, followed by injection shot to obtain molded articles in a disk form having a diameter of 40 mm and a thickness of 3 mm. The molded articles obtained were transparent, and no defects such as bubbles and silver streaks were observed. In addition, the content of the metal compound was 435 ppm in terms of metal atom based on the mass of the polymer. The results are shown in Table 1.

Comparative Example 2

In the same manner as described in Example 4, except that zinc acetate was not added, the pellets (A) obtained in Production Example 1 were kneaded and extruded at 260° C. using a twin-screw extruder ($\phi$=30 mm, L/D=30) having vent ports while sucking from the vent ports to obtain pellets (A0) of a thermoplastic resin composition.

The pellets (A0) were subjected to injection molding in the same manner as described in Example 4. At this time, no fine molded article in a disk form was obtained because of the occurrence of intense bubbling. The results are shown in Table 1.

Example 5

Using an extruder equipped with a T-die having a lip opening of 0.4 mm and a width of 150 mm, the pellets (A4) obtained in Example 4 were extruded at 260° C. and taken up with a roll having a controlled temperature of 110° C. to obtain a transparent film having a thickness of 100 μm and containing substantially no defects. In addition, the content of the metal compound was 408 ppm in terms of metal atom based on the mass of the polymer. The results are shown in Table 1.

Comparative Example 3

Using an extruder equipped with a T-die having a lip opening of 0.4 mm and a width of 150 mm, the pellets (A0) obtained in Comparative Example 2 were extruded at 260° C. and taken up with a roll having a controlled temperature of 110° C. At this time, no fine film was obtained because of the generation of streaks by bubbling.

Example 6

Using a Dulmadge single-screw extruder ($\phi$=50 mm, L/D=32) having vent ports, the pellets (B) obtained in Production Example 2 and acrylonitrile-styrene (AS) resin (Stylac AS783, available from Asahi Kasei Chemicals Corporation) in a mass ratio of 90/10 were kneaded together with 400 ppm of zinc acetate and extruded at 280° C. while sucking from the vent ports to obtain transparent pellets (B1) of a thermoplastic resin composition.

The pellets (B1) obtained were fed to an injection molding machine (model HM7, available from Nissei Plastic Industrial Co., Ltd.) in which the barrel temperature was set at 260° C., and then kept for 20 minutes, followed by injection shot to obtain molded articles in a disk form having a diameter of 40 mm and a thickness of 3 mm. The molded articles obtained were transparent, and no defects such as bubbles and silver streaks were observed. In addition, the content of the metal compound was 137 ppm in terms of metal atom based on the mass of the polymer. The results are shown in Table 1.

Example 7

Pellets (B2) of a thermoplastic resin composition were obtained in the same manner as described in Example 6, except that 550 ppm of calcium acetylacetate was used instead of 400 ppm of zinc acetate.

The pellets (B2) obtained were subjected to injection molding in the same manner as described in Example 6. At this time, the molded article obtained was transparent, and no defect such as bubbles and silver streaks were observed. In addition, the content of the metal compound was 88 ppm in terms of metal atom based on the mass of the polymer. The results are shown in Table 1.

Comparative Example 4

In the same manner as described in Example 6, except that zinc acetate was not added, using a Dulmadge single-screw extruder ($\phi$=50 mm, L/D=32) having vent ports, the pellets (B) obtained in Production Example 2 and acrylonitrile-styrene (AS) resin (Stylac AS783, available from Asahi Kasei Chemicals Corporation) in a mass ratio of 90/10 were kneaded and extruded at 280° C. while sucking from the vent ports to obtain pellets (B0) of a thermoplastic resin composition.

The pellets (B0) obtained were subjected to injection molding in the same manner as described in Example 6. At this time, no fine molded article in a disk form was obtained because of the occurrence of intense bubbling. The results are shown in Table 1.

Example 8

First, a 1 m³ reaction vessel equipped with a stirrer, a temperature sensor, a condenser tube, and a nitrogen introduction pipe was charged with 136 kg of methyl methacrylate, 34 kg of methyl 2-(hydroxy-methyl)acrylate and 166 kg of toluene.

The mixture was heated to 105° C. under a nitrogen gas stream to cause reflux, at which 187 g of t-amyl-peroxy-isononanoate (Lupasol 570, available from Arkema Yoshitomi Ltd.) was added as a polymerization initiator, and at the same time, solution polymerization was carried out under reflux at from about 105° C. to 110° C., while a solution containing 374 g of t-amylperoxyisononanoate (Lupasol 570, available from Arkema Yoshitomi Ltd.) dissolved in 3.6 kg of toluene was added dropwise over 2 hours. The reaction mixture was then aged over further 4 hours.

Then, 170 g of a mixture of stearyl phosphate and distearyl phosphate (Phoslex A-18, available from Sakai Chemical Industry Co., Ltd.) was added to the polymer solution obtained, which was allowed to cause cyclization condensation reaction under reflux at from about 90° C. to 110° C. for 5 hours. Then, the polymer solution obtained was introduced at a treatment rate of 13 kg/h on the resin basis into a vent type screw twin-screw extruder ($\phi$=42 mm, L/D=42) on the following conditions: barrel temperature, 250° C., revolution number, 150 rpm; degree of vacuum, from 13.3 to 400 hPa (from 10 to 300 mmHg); the number of rear vents, 1; and the number of fore vents, 4. In this extruder, the polymer solution was further allowed to cause cyclization condensation reaction and devolatilization, and then extruded while injecting, between the third fore vent and the fourth vent, zinc acetate in the form of an aqueous solution so as to be 400 ppm relative to the amount of the polymer obtained, to obtain transparent pellets (B3) of a thermoplastic resin composition.

The lactone ring-containing polymer contained in the thermoplastic resin composition obtained was similar to that obtained in Production Example 2, and when the dynamic TG measurement was carried out for the lactone ring-containing polymer, a weight loss of 0.15% by mass was detected. Moreover, the lactone ring-containing polymer had a weight average molecular weight of 147,000, a melt flow rate of 11.0 g/10 min., and a glass transition temperature of 130° C.

The pellets (B3) obtained were fed to an injection molding machine (model HM7, available from Nissei Plastic Industrial Co., Ltd.) in which the barrel temperature was set at 260° C., and then kept for 20 minutes, followed by injection shot to obtain molded articles in a disk form having a diameter of 40 mm and a thickness of 3 mm. The molded articles obtained were transparent, and no defects such as bubbles and silver streaks were observed. In addition, the content of the metal compound was 131 ppm in terms of metal atom based on the mass of the polymer. The results are shown in Table 1.

Example 9

First, a 1 m³ reaction vessel equipped with a stirrer, a temperature sensor, a condenser tube, and a nitrogen introduction pipe was charged with 240 kg of methyl methacrylate, 60 kg of methyl 2-(hydroxy-methyl)acrylate, and 294 kg of toluene.

The mixture was heated to 105° C. under a nitrogen gas stream to cause reflux, at which 309 g of t-amyl-peroxy-isononanoate (Lupasol 570, available from Arkema Yoshitomi Ltd.) was added as a polymerization initiator, and at the same time, solution polymerization was carried out under reflux at from about 105° C. to 110° C., while a solution containing 621 g of t-amylperoxyisononanoate (Lupasol 570, available from Arkema Yoshitomi Ltd.) dissolved in 3.7 kg of toluene was added dropwise over 2 hours. The reaction mixture was then aged over further 6 hours.

Then, 300 g of octyl phosphate (Phoslex A-8, available form Sakai Chemical Industry Co., Ltd.) was added to the polymer solution obtained, which was allowed to cause cyclization condensation reaction under reflux at from about 90° C. to 110° C. for 5 hours. Then, the polymer solution obtained was introduced at a treatment rate of 16 kg/h on the resin basis into a vent type screw twin-screw extruder ($\phi$=42 mm, L/D=42) on the following conditions: barrel temperature, 250° C.; revolution number, 240 rpm; degree of vacuum, from 13.3 to 400 hPa (from 10 to 300 mmHg); the number of rear vents, 1; and the number of fore vents, 4. In this extruder, the polymer solution was further allowed to cause cyclization condensation reaction and devolatilization, and then extruded while injecting, between the third fore vent and the fourth vent, zinc octoate (Nikka Octix Zinc 18%, available from Nihon Kagaku Sangyo Co., Ltd.) in the form of a toluene solution so as to be 1,470 ppm relative to the amount of the polymer obtained, to obtain transparent pellets (B4) of a thermoplastic resin composition.

The lactone ring-containing polymer contained in the thermoplastic resin composition obtained had a weight average molecular weight of 148,000, a melt flow rate of 10.9 g/10 min., and a glass transition temperature was 131° C.

The pellets (B4) obtained were fed to an injection molding machine (model HM7, available from Nissei Plastic Industrial Co., Ltd.) in which the barrel temperature was set at 260° C., and then kept for 20 minutes, followed by injection shot to obtain molded articles in a disk form having a diameter of 40 mm and a thickness of 3 mm. The molded articles obtained were transparent, and no defects such as bubbles and silver streaks were observed. In addition, the content of the metal compound was 250 ppm in terms of metal atom based on the mass of the polymer. The results are shown in Table 1.

Example 10

First, a 30 L reaction vessel equipped with a stirrer, a temperature sensor, a condenser tube, and a nitrogen introduction pipe was charged with 7 kg of methyl methacrylate, 2 kg of methacrylic acid, 1 kg of styrene, and 10 kg of toluene.

The mixture was heated to 105° C. under a nitrogen gas stream to cause reflux, at which 12 g of t-amylperoxy-isononanoate (Lupasol 570, available from Arkema Yoshitomi Ltd.) was added as a polymerization initiator, and at the same time, solution polymerization was carried out under reflux at from about 105° C. to 120° C., while a solution containing 24 g of t-amylperoxy-isononanoate (Lupasol 570, available from Arkema Yoshitomi Ltd.) dissolved in 136 g of toluene was added dropwise over 2 hours. The reaction mixture was then aged over further 4 hours.

Then, 20 g of magnesium ethoxide was added to the polymer solution obtained, which was allowed to cause cyclization condensation reaction under reflux at from about 90° C. to 120° C. for 5 hours. Then, the polymer solution obtained was introduced at a treatment rate of 2.0 kg/h on the resin basis into a vent type screw twin-screw extruder (φ=29.75 mm, L/D=30) on the following conditions: barrel temperature, 260° C.; revolution number, 100 rpm; degree of vacuum, from 13.3 to 400 hPa (from 10 to 300 mmHg); the number of rear vents, 1; and the number of fore vents, 4. In this extruder, the polymer solution was further allowed to cause cyclization condensation reaction and devolatilization, and then extruded while injecting, between the third fore vent and the fourth vent, a mixture of stearyl phosphate and distearyl phosphate (Phoslex A-18, available from Sakai Chemical Industry Co., Ltd.) in the form of a toluene solution so as to be 5,000 ppm relative to the amount of the polymer obtained, to obtain transparent pellets (C1) of a thermoplastic resin composition.

The polymer having a ring structure composed of glutaric anhydride, contained in the thermoplastic resin composition obtained, had a weight average molecular weight of 140,000, a melt flow rate of 13.0 g/10 min., and a glass transition temperature of 127° C.

The pellets (C1) obtained were fed to a melt indexer set at 260° C. and then kept for 20 minutes, followed by extrusion in a strand form under a load of 10 kg. At this time, the amount of bubbles was 0 piece/g. In addition, the content of the metal compound was 430 ppm in terms of metal atom based on the mass of the polymer. The results are shown in Table 1.

articles, which were transparent and into which neither bubbles nor silver streaks had entered at the time of thermal processing, were obtained.

In contrast, the thermoplastic resin compounds of Comparative Examples 1 to 4 contain no deactivator to be added thereto, and therefore, intense bubbling occurred at the time of thermal processing and no fine molded articles were obtained.

Thus, it is found that thermoplastic resin compositions obtained by causing cyclization condensation reaction using a catalyst, in the production of a methacrylic resin having a ring structure in the main chain thereof and a glass transition temperature of 110° C. or higher, to form the ring structure and then adding a deactivator for the catalyst to the methacrylic resin obtained can provide molded articles, which are excellent both in transparency and in heat resistance and have desired characteristics such as mechanical strength and forming processability, and particularly, which cause neither bubbling phenomenon nor entering of bubbles or silver streaks at the time of thermal processing.

The thermoplastic resin composition and a production process thereof of the present invention can widely be used in various applications effectively utilizing transparency, heat resistance, and the like, and particularly can make a great contribution to the fields relevant to methacrylic resins, par-

TABLE 1

| | Methacrylic resin | Deactivator for transesterification catalyst | Thermoplastic resin composition | Glass transition temperature of methacrylic resin | Content of metal compound[4] | Molded article | Amount of bubbles and generation of defects |
|---|---|---|---|---|---|---|---|
| Example 1 | pellet (A)[1] | zinc oxide, 500 ppm | pellet (A1) | 131° C. | 377 ppm | Strand | The amount of bubbles was 0 piece/g. |
| Example 2 | pellet (A)[1] | calcium stearate, 1,000 ppm | pellet (A2) | 131° C. | 58 ppm | strand | The amount of bubbles was 1.3 pieces/g. |
| Example 3 | pellet (A)[1] | zinc 2-ethyl hexanoate, 2,000 ppm | pellet (A3) | 131° C. | 320 ppm | strand | The amount of bubbles was 2 pieces/g. |
| Comp. Ex. 1 | pellet (A) | — | pellet (A0) | 131° C. | 0 ppm | strand | The amount of bubbles was 33.3 pieces/g. |
| Example 4 | pellet (A)[1] | zinc acetate, 1,200 ppm | pellet (A4) | 131° C. | 435 ppm | disk | No defects such as bubbles and silver streaks |
| Comp. Ex. 2 | pellet (A) | — | pellet (A0) | 131° C. | 0 ppm | disk | Intense bubbling occurred. |
| Example 5 | pellet (A)[1] | zinc acetate, 1,200 ppm | pellet (A4) | 131° C. | 408 ppm | film | Substantially no defects |
| Comp. Ex. 3 | pellet (A) | — | pellet (A0) | 131° C. | 0 ppm | film | Streaks were generated by bubbling. |
| Example 6 | pellet (B)[2] | zinc acetate, 400 ppm | pellet (B1) | 130° C. | 137 ppm | disk | No defects such as bubbles and silver streaks |
| Example 7 | pellet (B)[2] | calcium acetylacetate, | pellet (B2) | 130° C. | 88 ppm | disk | No defects such as bubbles and silver streaks |
| Comp. Ex. 4 | pellet (B) | — | pellet (B0) | 130° C. | 0 ppm | disk | Intense bubbling occurred. |
| Example 8 | Polymer solution[3] | zinc acetate (aqueous solution), 400 ppm | pellet (B3) | 130° C. | 131 ppm | disk | No defects such as bubbles and silver streaks |
| Example 9 | Polymer solution[3] | zinc octoate (toluene solution), 1,470 ppm | pellet (B4) | 131° C. | 250 ppm | disk | No defects such as bubbles and silver streaks |
| Example 10 | Polymer solution[3] | mixture of stearyl phosphate and distearyl phosphate (toluene solution), 5,000 ppm | pellet (C1) | 127° C. | 430 ppm | strand | The amount of bubbles was 0 piece/g. |

[1]Pellet (A) was kneaded together with the deactivator in the extruder.
[2]Pellet (B) was kneaded together with the deactivator in the extruder.
[3]The deactivator was added while forming the polymer solution in the extruder.
[4]The content of the metal compound is an amount in terms of metal atom based on the mass of the methacrylic resin.

As can be seen from Table 1, the thermoplastic resin compounds of Example 1 to 10 contain respective kinds of deactivators added thereto, and therefore, various kinds of molded ticularly because of making it possible to provide molded articles causing no entering of bubbles or silver streaks at the time of thermal processing.

The invention claimed is:

1. A thermoplastic resin composition comprising a methacrylic resin having a ring structure in a main chain thereof and a glass transition temperature of 110° C. or higher, and at least one kind of metal compound selected from metal salts of organophosphorous compounds and metal salts of acidic organosulfur compounds, wherein a content of the metal compound in the composition is from 10 to 10,000 ppm in terms of metal atom based on a mass of the methacrylic resin.

2. The thermoplastic resin composition according to claim 1, wherein the metal compound is a salt of a representative metal element.

3. The thermoplastic resin composition according to claim 2, wherein the representative metal element is calcium, magnesium, or zinc.

4. The thermoplastic resin composition according to claim 1, wherein a number of bubbles generated when the composition is heated at 260° C. for 20 minutes is 20 pieces/g or smaller.

5. The thermoplastic resin composition according to claim 1, wherein the methacrylic resin has a lactone ring-containing structure.

6. The thermoplastic resin composition according to claim 1, wherein the methacrylic resin has a lactone ring structure shown by following formula (1):

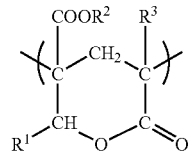

(1)

wherein $R^1$, $R^2$, and $R^3$ each independently represents a hydrogen atom or an organic residue having from 1 to 20 carbon atoms, in which the organic residue optionally contains an oxygen atom.

7. A process for producing a thermoplastic resin composition according to claim 1, the process comprising carrying out, when preparing a methacrylic resin having a ring structure in a main chain thereof and a glass transition temperature of 110° C. or higher, cyclization condensation reaction using a catalyst to form the ring structure; and then adding a deactivator of the catalyst.

* * * * *